United States Patent
Smith et al.

(10) Patent No.: US 8,451,317 B2
(45) Date of Patent: May 28, 2013

(54) INDEXING A DATA STREAM

(75) Inventors: Matthew David Smith, Corvallis, OR (US); Douglas A. Pederson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1793 days.

(21) Appl. No.: 11/799,386

(22) Filed: Apr. 30, 2007

(65) Prior Publication Data

US 2008/0266382 A1     Oct. 30, 2008

(51) Int. Cl.
*H04N 7/14* (2006.01)
(52) U.S. Cl.
USPC ............... 348/14.12; 348/14.01; 370/260
(58) Field of Classification Search
USPC ...... 348/14.01–14.16; 370/260, 261; 709/204
See application file for complete search history.

(56) References Cited

U.S. PATENT DOCUMENTS

| | | | |
|---|---|---|---|
| 5,764,901 A | 6/1998 | Skarbo | |
| 6,330,392 B1 * | 12/2001 | Nakatani et al. | 386/288 |
| 6,424,636 B1 * | 7/2002 | Seazholtz et al. | 370/295 |
| 6,490,553 B2 * | 12/2002 | Van Thong et al. | 704/211 |
| 6,698,020 B1 * | 2/2004 | Zigmond et al. | 725/34 |
| 6,829,781 B1 * | 12/2004 | Bhagavath et al. | 725/94 |
| 7,075,544 B2 * | 7/2006 | Kim et al. | 345/543 |
| 2002/0078456 A1 * | 6/2002 | Hudson et al. | 725/60 |
| 2003/0021346 A1 * | 1/2003 | Bixby et al. | 375/240.25 |
| 2005/0091696 A1 * | 4/2005 | Wolfe et al. | 725/116 |
| 2005/0180341 A1 | 8/2005 | Nelson | |
| 2007/0156843 A1 * | 7/2007 | Sagen et al. | 709/217 |
| 2009/0116812 A1 * | 5/2009 | O'Brien et al. | 386/52 |

* cited by examiner

*Primary Examiner* — Xu Mei

(57) ABSTRACT

A method of indexing a data stream is disclosed. The method includes initiating the data stream in the video conference, recording the data stream, indexing the data stream by generating a transcript of the recorded data stream, linking the transcript with a video portion of the data stream and storing the indexed data stream onto a data storage medium.

15 Claims, 4 Drawing Sheets

INDEXING A DATA STREAM

BACKGROUND

In a video conference environment for performing an electronic conference through a communication network, a video conference system is provided in each of locations in which participants of a conference come together and a plurality of such video conference systems communicate via the communication network. Each video conference system collects image information and audio information in a location in which the conference system is provided. The image information and the audio information are synthesized and the synthesized information is distributed to the respective conference systems. In each conference system, the image information is displayed on a display device provided in the video conference system and the audio information is outputted through a loudspeaker also provided in the video conference system.

People are often unable to attend the video conference or they may want to refer back to something that was said in the conference. However, there is no easy way to accomplish this. Recording a video conference usually involves manually setting up a camera and sitting through the meeting aiming it at whoever is talking. Furthermore, once the meeting is recorded, there is no quick way to search through the recorded meeting in order to find a specific part of the meeting.

DETAILED DESCRIPTION

Figure 1:
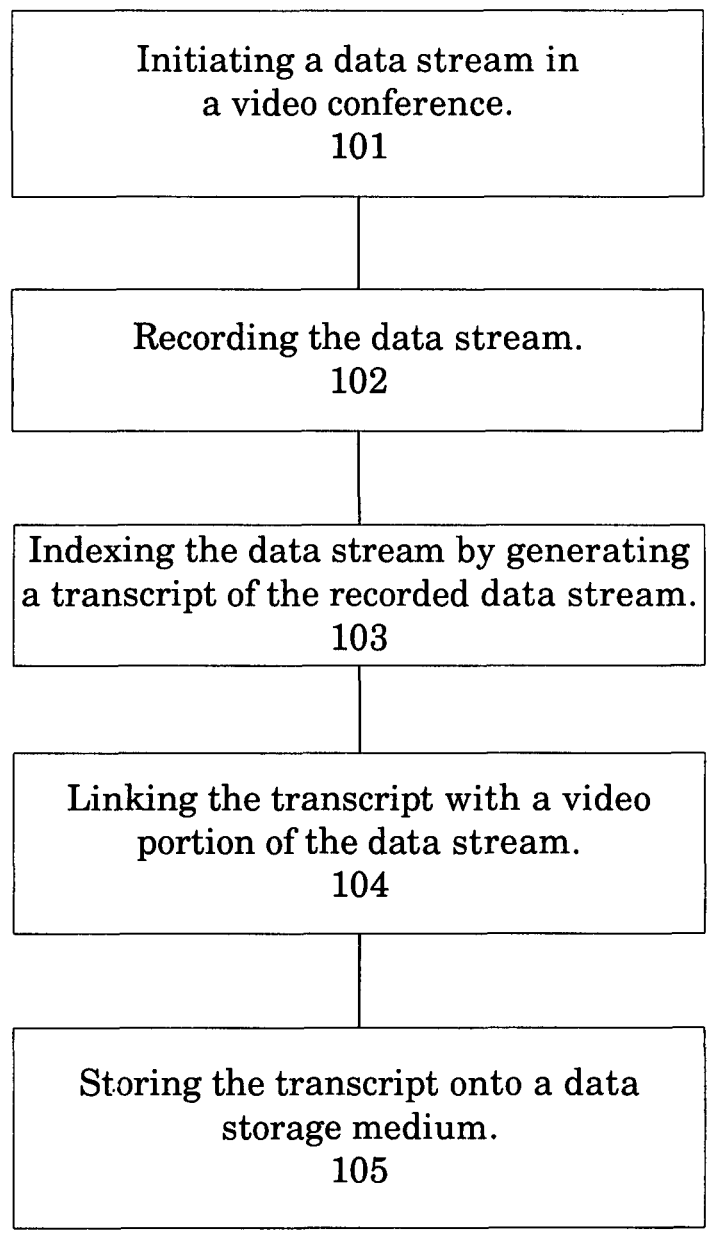
FIG. 1 is a flowchart of a method in accordance with an embodiment of the present invention.

As shown in the drawings for purposes of illustration, a method of indexing a data stream is disclosed. In an embodiment, the method includes initiating the data stream in the video conference, recording the data stream, generating an index of the recorded data stream and storing the indexed data stream onto a data storage device. By indexing the recorded data stream, a searchable data stream is generated whereby specific portions of the data stream can be readily accessed.

FIG. 1 is a flowchart of a method in accordance with an embodiment. A first step 101 involves initiating a data stream in the video conference. A second step 102 involves recording the data stream. A third step 103 involves indexing the data stream by generating a transcript of the recorded data stream. A fourth step 104 includes linking the transcript with a video portion of the data stream. A final step 105 includes storing the transcript onto a data storage medium. Again, by indexing the recorded data stream, a searchable data stream is generated whereby specific portions of the data stream can be readily accessed.

Figure 2:
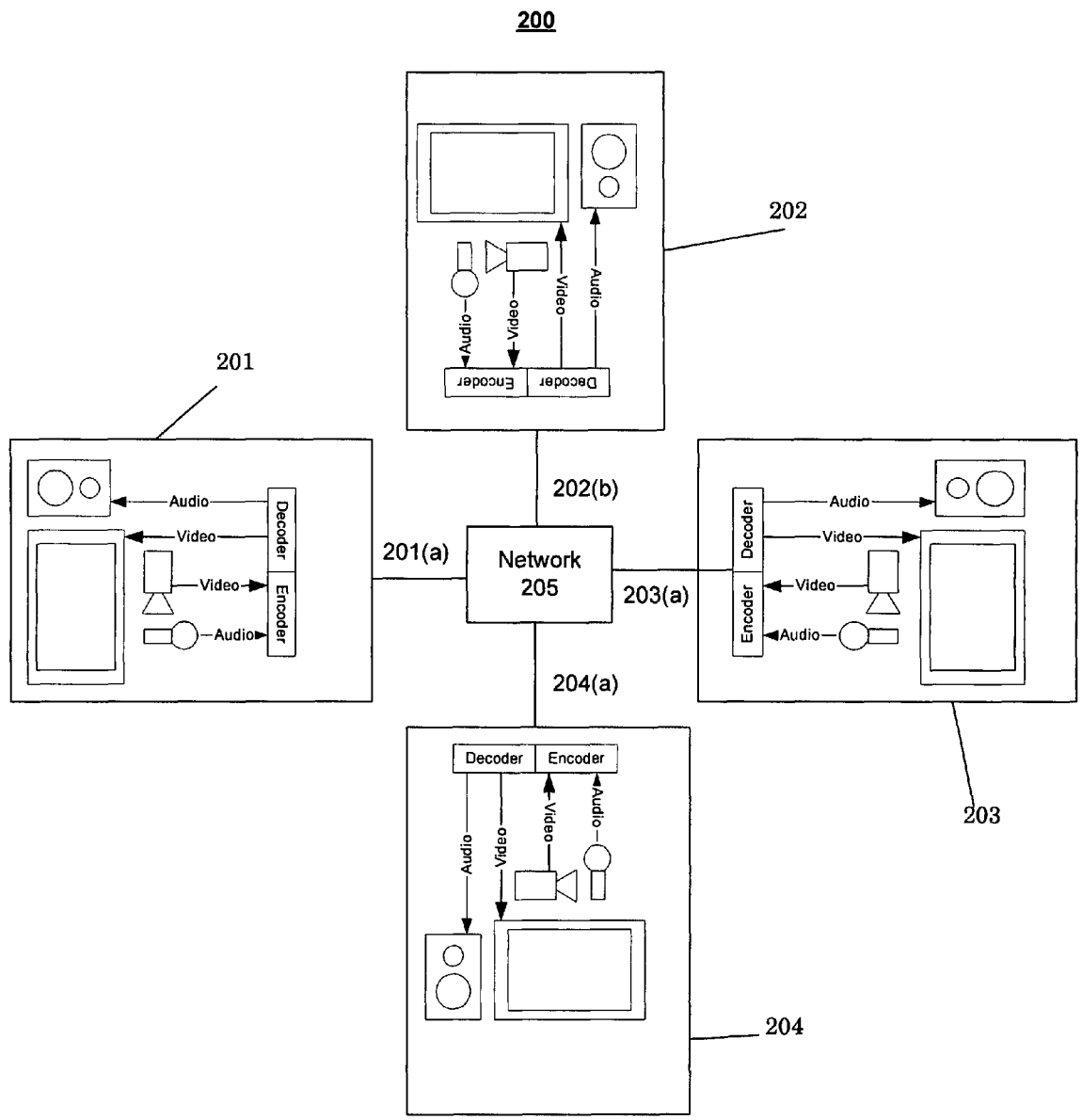
FIG. 2 is an illustration of an exemplary video conference environment in accordance with an embodiment of the present invention.

Referring to FIG. 2, an exemplary video conference environment is illustrated. The environment 200 includes multiple video conference systems 201-204 associated with multiple sites of the video conference. The respective video conference systems 201-204 are located in different points in the environment 200 and send image and voice data of a video conference through the bi-directional digital transmission paths 201(a)-204(a) and simultaneously receive image and voice data of other video conference systems and display the images and output the voices thereof via network 205.

In an embodiment, the network 205 is a system that transmits any combination of voice, video and/or data between users. A network typically includes a network operating system, one or more computer systems, the cables connecting them and all supporting hardware and software in between such as bridges, routers and switches. The network operating system manages the different aspects of the network and makes it possible for the network components to transmit data therebetween.

Figure 3:
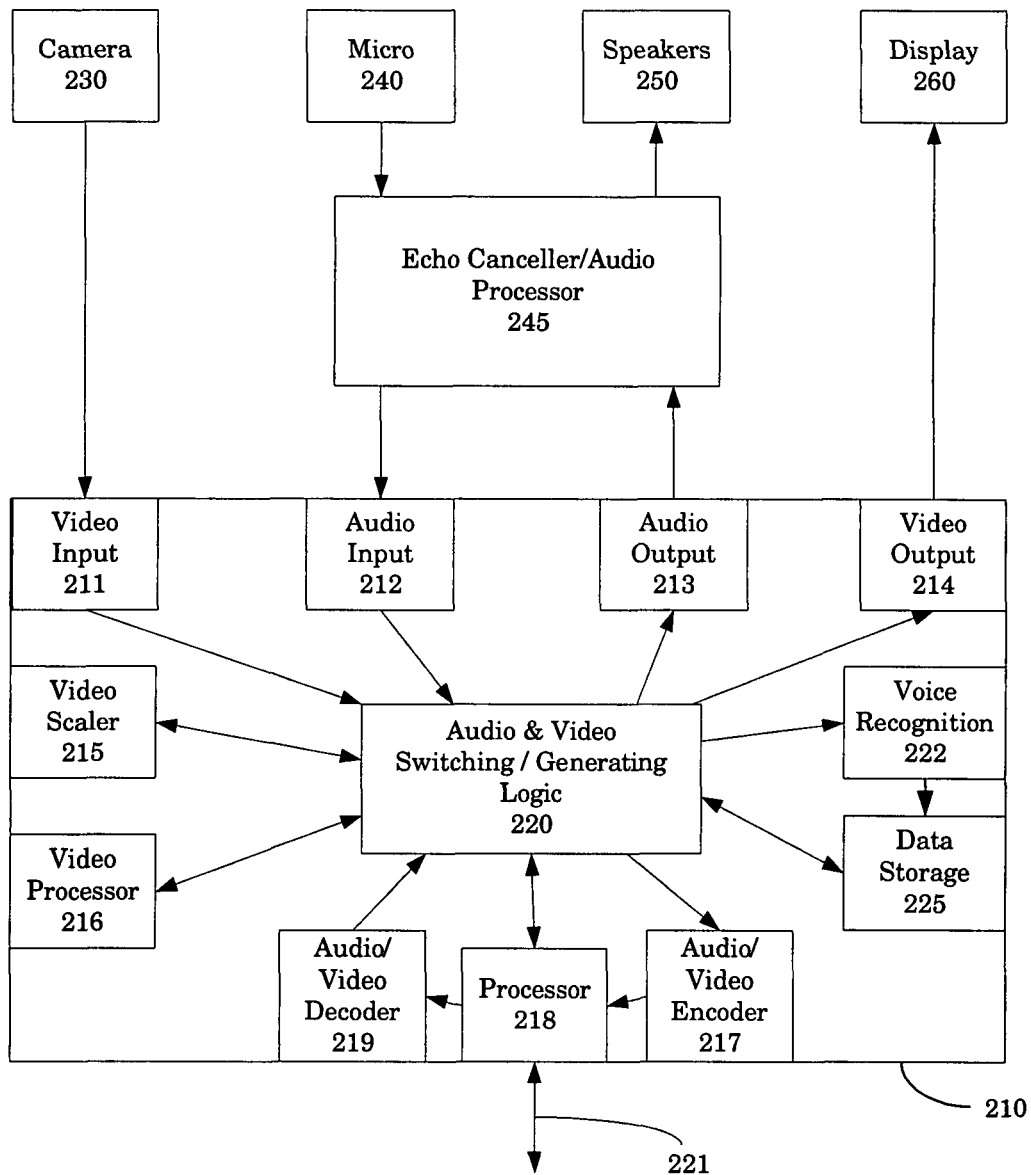
FIG. 3 is a block diagram showing a construction of video conference system of the video conference environment in accordance with an embodiment of the present invention.

FIG. 3 is a block diagram showing a construction of video conference system 201 of the video conference environment 200. Since the other video conference systems have the same construction as that of the video conference system 201, respectively, only the video conference system 201 need be described.

The video conference system 201 includes an audio/video (A/V) system 210. The A/V system 210 includes a video input 211, an audio input 212, an audio output 213 and a video output 214. The configuration 210 also includes a video scaler 215, a video processor 216, an A/V encoder 217, processor 218, A/V decoder 219 and A/V switching and generating logic 220 wherein the A/V switching and generating logic 220 is coupled to data storage component 225. Bi-directional digital transmission path 221 is configured for transmitting and receiving A/V data over the network 205.

The A/V system 210 is configured to communicate with a video camera 230 for input of the image of the participant, a microphone 240 for input of a voice of a participant of the video conference, a loud-speaker 250 for output of voices of other video conference participant(s) and a display 260 for output of the image of another participant(s) of the video conference. The A/V system 210 is also configured to communicate with an audio processing component 245. The audio processing component 245 includes an audio processor and an echo canceller.

To send audio and video data over a network or to store it on a storage medium, the data is "encoded" or "compressed" since the "raw" or "uncompressed" audio/video data is to large to be feasibly transmitted over the network or store onto a storage medium. Encoding audio/video data significantly reduces the size of the data without significantly affecting the quality of the video. Decoding audio/video data involves "decompressing" the encoded data and thereby converting it into data that can be viewed or processed.

Videoconferencing data is created by the video camera 230 and the microphone 240 whereby the microphone 240 creates audio data and the video camera create video data. When this data is encoded and transmitted it is referred to as a "stream". Usually audio and video streams are combined into one stream herein referred to as an A/V stream.

The A/V switching and generating logic 220 is configured for multiplexing and processing video signals received from video camera 230 via the video input 211 and audio signals received from the microphone 240 via the audio input 212. Additionally, the A/V switching and generating logic 220 transmits decoded A/V signals received from the A/V decoder 219 to the speaker 250 and the display 260 respectively via audio output 213 and video output 214.

In an embodiment, the A/V stream is generated from the camera 230 and the microphone 240, respectively. This stream is multiplexed by the A/V switching and generating logic 220 and transmitted to the A/V encoder 217. The encoded A/V data is than transmitted to other video conference participants via the bi-directional digital transmission path 221.

Although the system 201 is described in conjunction with above-delineated components, it should be noted that the system 201 is an exemplary system. One of ordinary skill in the art will readily recognize that a variety of different components could be employed while remaining within the spirit and scope of the inventive concepts. For example, the A/V system 210 is illustrated as a stand alone hardware unit, however the A/V system 210 could be implemented as functional software blocks within a personal computer (PC) system.

In an embodiment, the video conference can be recorded, indexed and saved to the data storage device 225. The data storage device 225 is a data storage medium such as a hard disk drive (HDD), a digital video disk (DVD), or the like. In order to accomplish this task, multiple A/V streams (based on the number of video conference participants) are combined and stored in a single file on the data storage device 225. Accordingly, this file can be later accessed and viewed from a $3^{rd}$ person point of view.

Furthermore, the proposed system allows for the automatic generation of a transcript of the video conference. In an embodiment, a voice recognition software module 222 is employed by the A/V system 210 to convert the participant's spoken words to text. Voice or speech recognition is the ability of a machine or program to receive and interpret dictation, or to understand and carry out spoken commands. For use with computers, analog audio must be converted into digital signals. Accordingly, an embodiment of the video conference system 201 includes a voice recognition module 222 to automatically generate a transcript of the video conference.

Also, the generated transcript of the meeting is linked with the video recording of the meeting via one or more "video hyperlinks". Accordingly, the transcript of the meeting can be subsequently searched based on a phrase and linked to the specific portion of the video containing the phrase. For example, if a user wants to review the contract terms that were discussed in recorded meeting, the generated transcript can be searched for the text phrase "Intellectual Property". Once the occurrence(s) of the phrase are identified within the transcript, the recorded video portion of meeting is initiated at a selected point in the transcript where the phrase occurs.

Figure 4:
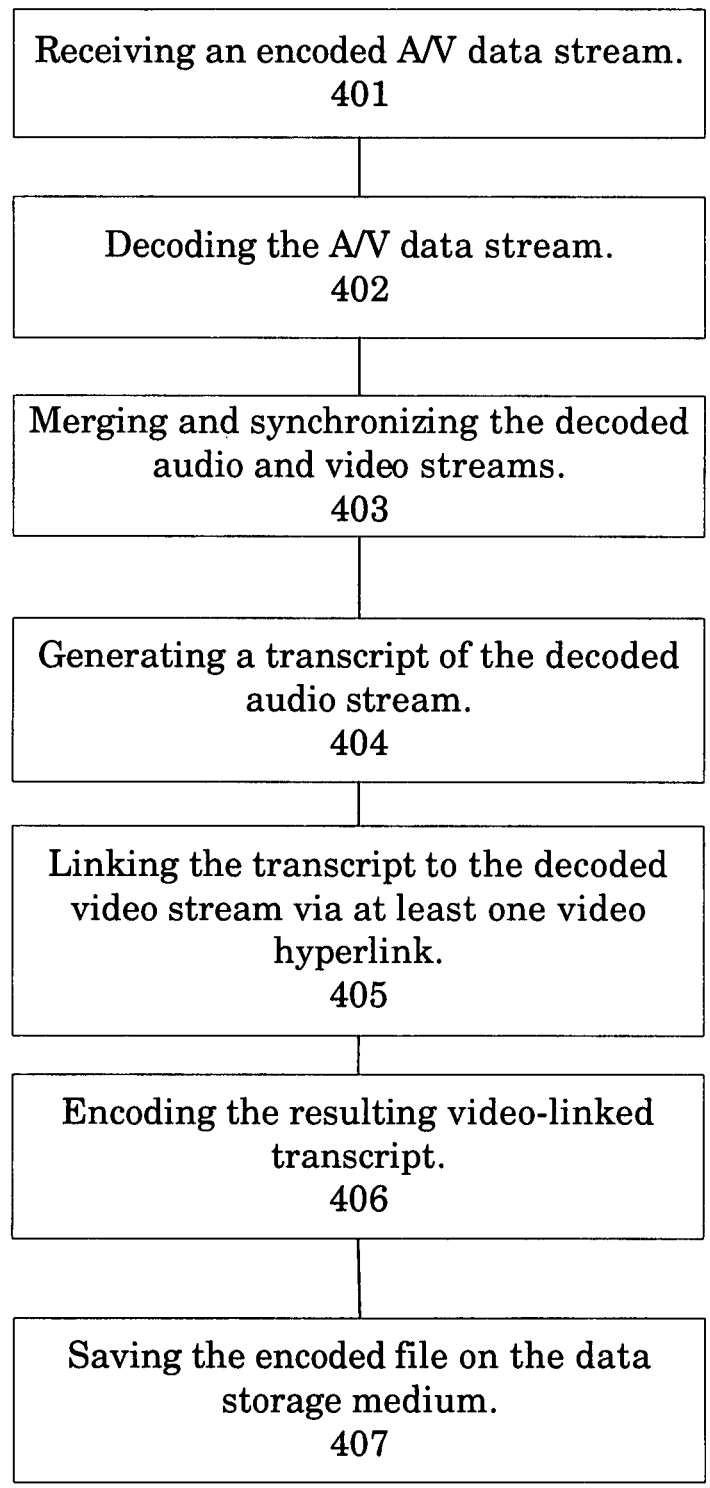
FIG. 4 is a more detailed flowchart that outlines an alternate embodiment of the present invention.

FIG. 4 is a more detailed flowchart that outlines an alternate embodiment. A first step 401 involves receiving an encoded A/V data stream. A second step 402 involves decoding the A/V data stream. A next step 403 includes merging and synchronizing the decoded audio and video streams. This step involves merging multiple video images into one image. This could be accomplished with various layouts and some overlapping and/or fading of the images. Additionally, some of the video images could be scaled down (reduced in resolution) to reduce the resulting file size.

A next step 404 involves generating a transcript of the decoded audio stream. In an embodiment, this is accomplished via voice recognition software. In step 405, the transcript is linked to the video stream via at least one video hyperlink. Step 406 involves encoding the resulting video-linked transcript. A final step 407 includes saving the encoded file on the data storage medium. Once the encoded file is saved, the file can be opened and viewed with a standard A/V decoder (example: Windows Media Player, Quicktime, etc.)

Optionally, the meeting recordation process can begin upon the initialization of video conference. There would be some type of recording indicator so that participants knew that the meeting was being recorded and possibly which channels were currently selected for recording. Once the meeting is finished, a user interaction e.g. hit an "accept" button via a graphical user interface (GUI), can be employed to trigger the system to transfer the recorded meeting to a data storage medium such as a DVD, hard drive, or the like. Otherwise, if the recorded meeting is not to be immediately transferred to a data storage medium, the saved data can be archived to be transferred later or erased from memory.

A method of indexing a data stream is disclosed. The method includes initiating the data stream in the video conference, recording the data stream, generating an index of the recorded data stream and storing the indexed data stream onto a data storage device. By indexing the recorded data stream, a searchable data stream is generated whereby specific portions of the data stream can be readily accessed.

The above-described embodiment may also be implemented, for example, by operating a computer system to execute a sequence of computer readable instructions. Accordingly, a computing device typically includes at least some form of computer readable media. Computer readable media can be any available media that can be accessed by computing device. By way of example, and not limitation, computer readable media may comprise computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by a computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for indexing a data stream.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A method of indexing a data stream in a video conference comprising:

initiating the data stream in the video conference;

recording the data stream;

indexing the data stream by generating a transcript of the recorded data stream;

linking the transcript with a video portion of the data stream;

encoding the video-linked transcript; and storing the encoded video-linked transcript onto a data storage medium.

2. The method of claim 1 wherein the data stream comprises an audio portion and the video portion.

3. The method of claim 2 wherein generating a transcript of the recorded data stream further comprises:

utilizing a voice recognition software application to generate a transcript of the audio portion.

4. The method of claim 1 wherein linking the video portion with the transcript further comprises:

utilizing at least one video hyperlink to link the video portion with the transcript.

5. The method of claim 1, further comprising:

viewing the encoded video-linked transcript with an audio/video decoder.

6. A computer program product for indexing a data stream in a video conference, the computer program product comprising a non-transitory computer usable medium having computer readable program means stored thereon for causing a computer to perform the steps of:

initiating the data stream in the video conference;

recording the data stream;

indexing the data stream by generating a transcript of the recorded data stream;

linking the transcript with a video portion of the data stream;

encoding the video-linked transcript; and storing the encoded video-linked transcript onto a data storage medium.

7. The computer program product of claim 6 wherein the data stream comprises an audio portion and the video portion.

8. The computer program product of claim 6 wherein generating a transcript of the recorded data stream further comprises:

utilizing a voice recognition software application to generate a transcript of the audio portion.

9. The computer program product of claim 8 wherein linking the video portion with the transcript further comprises:

utilizing at least one video hyperlink to link a portion of the video portion with the transcript.

10. A video conference system comprising:

a first point; and a second point wherein each of the first and second points comprises an audio/video (A/V) system comprising at least one data input, at least one data output, an A/V encoder, an A/V decoder, a data storage component and an A/V switching and generating logic configured to interact with the at least one data input, the at least one data output, the A/V encoder, the A/V decoder and the data storage component to perform the steps of:

initiating a data stream in the video conference;

recording the data stream;

indexing the data stream by generating a transcript of the recorded data stream;

linking the transcript with a video portion of the data stream;

encoding the video-linked transcript; and storing the encoded video-linked transcript onto a data storage medium.

11. The system of claim 10 wherein the data stream comprises an audio portion and a video stream.

12. The system of claim 11 wherein further comprising a voice recognition software module coupled to the A/V switching and generating logic for generating a transcript of the audio portion.

13. The system of claim 10 wherein the at least one data input further comprises a video input and an audio input.

14. The system of claim 10 the at least one data output further comprises a video output and an audio output.

15. The system of claim 10 wherein linking the transcript with the video portion further comprises:

utilizing at least one video hyperlink to link the video portion with the transcript.

* * * * *

UNITED STATES PATENT AND TRADEMARK OFFICE
CERTIFICATE OF CORRECTION

PATENT NO. : 8,451,317 B2
APPLICATION NO. : 11/799386
DATED : May 28, 2013
INVENTOR(S) : Matthew David Smith et al.

It is certified that error appears in the above-identified patent and that said Letters Patent is hereby corrected as shown below:

In the Claims:

In column 6, line 34, in Claim 14, after "claim 10" insert -- wherein --.

Signed and Sealed this
Twentieth Day of August, 2013

Teresa Stanek Rea
*Acting Director of the United States Patent and Trademark Office*